United States Patent
Berstis (10) Patent No.: US 6,515,651 B1
(45) Date of Patent: Feb. 4, 2003

(54) REVERSIBLE WIRELESS POINTING DEVICE

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/159,957

(22) Filed: Sep. 24, 1998

(51) Int. Cl.[7] .................................................. G09G 5/08
(52) U.S. Cl. ...................... 345/157; 345/158; 345/161; 345/167
(58) Field of Search ................................. 345/157, 158, 345/161, 163, 167, 172; 348/739

(56) References Cited

U.S. PATENT DOCUMENTS

| | | | |
|---|---|---|---|
| 4,562,347 A | * 12/1985 | Hovey et al. ................ 250/221 |
| 4,736,191 A |   4/1988 | Matzke et al. | |
| 5,063,289 A | * 11/1991 | Jasinski et al. ............. 250/221 |
| 5,280,276 A | *  1/1994 | Kwok ......................... 345/167 |
| 5,457,479 A | * 10/1995 | Cheng ......................... 345/163 |
| 5,510,810 A | *  4/1996 | Nishijima et al. ........... 345/161 |
| 5,555,004 A |   9/1996 | Ono et al. | |
| 5,610,632 A | *  3/1997 | Perry .......................... 345/163 |
| 5,631,669 A | *  5/1997 | Stobbs et al. ................ 345/163 |
| 5,657,012 A |   8/1997 | Tait | |
| 5,670,955 A | *  9/1997 | Thorne, III et al. ......... 345/157 |
| 5,691,747 A | * 11/1997 | Amano ........................ 345/157 |
| 5,706,031 A | *  1/1998 | Brendzel et al. ............ 345/172 |
| 5,714,980 A | *  2/1998 | Niino .......................... 345/157 |
| 5,745,055 A | *  4/1998 | Redlich et al. .............. 345/157 |
| 5,796,355 A |   8/1998 | Smigelski | |
| 5,812,114 A | *  9/1998 | Loop ........................... 345/157 |
| 5,847,695 A | * 12/1998 | Duncan et al. .............. 345/163 |
| 5,854,625 A | * 12/1998 | Frisch et al. ................ 345/174 |
| 5,949,354 A |   9/1999 | Chang | |
| 5,973,668 A | 10/1999 | Watanabe | |
| 6,115,030 A |  9/2000 | Berstis et al. | |
| 6,271,830 B1 | 8/2001 | Berstis | |

* cited by examiner

Primary Examiner—Richard Hjerpe
Assistant Examiner—Kimnhung Nguyen
(74) Attorney, Agent, or Firm—Jeffrey S. LaBaw; Bracewell & Patterson, L.L.P.

(57) ABSTRACT

A reversible, wireless pointing device for a data processing system may be operated as either a handheld remote or in conjunction with a surface in the manner of a conventional mouse. A force sensor projects from one surface of the wireless point device body. Manipulation of the force sensor may be detected by measurement of a capacitive or resistive value dependent upon the position or orientation of the force sensor. Infrared signals representative of the manipulation are emitted by the pointing device and detected by the data processing system from control of a display cursor's movement by the operating system. The force sensor may be manipulated directly by a user's thumb or other appendage, or indirectly by contact between the force sensor and an underlying surface and actual or attempted movement of the pointing device relative to the surface. The force sensor may be slightly elastomeric with a rubbery texture to "grip" the underlying surface. Projections from or spacers on the body of the pointing device maintain a sufficient distance from the underlying surface to minimize friction while allow the force sensor to contact the surface with a slight pressure or compressive force. A switch located on the opposite side of the pointing device from the force sensor may be actuated in the manner of a trigger when operated in one orientation or in the manner of a conventional mouse button when operated in the opposite orientation. For a force sensor similar to that utilized in trackpoint-type devices, a smaller surface space is required for operation since actual movement is not required, only pressure or lateral force.

14 Claims, 7 Drawing Sheets

REVERSIBLE WIRELESS POINTING DEVICE

RELATED APPLICATIONS

The present invention is related to the subject matter of the following commonly assigned, copending U.S. patent applications Ser. No. 08/993,509 entitled "Improved Trackpoint Device" and filed on Dec. 18, 1997; and Ser. No. 09/159,960 entitled "Three-Point Capacitor Trackpoint" and filed on Sep. 24, 1998. The content of the above-identified applications is incorporated herein by reference.

BACKGROUND OF THE INVENTION

1. Technical Field

The present invention relates in general to pointing devices for data processing systems and in particular to reversible, wireless pointing devices. Still more particularly, the present invention relates to construction and operation of a reversible, wireless pointing device which may be employed either as a handheld device or on a flat surface similar to a conventional mouse.

2. Description of the Related Art

Data processing systems with operating systems or applications employing a graphical user interface (GUI) typically include a pointing device such as a mouse, trackball, or touch pad. Using a pointing device, a user directs movement of a pointer icon (or "cursor," any graphical object utilized to point to a particular location in a display including, for example, a figure in a computer game) across the user interface by performing corresponding manual movements on the pointing device, for example by sliding the mouse, rolling the ball of the trackball, or moving across the surface of the touch pad. One or more buttons on the pointing device may be actuated to select items within the interface, such as icons representing applications or operating system controls.

One particular example of a pointing device employed in data processing systems is IBM Corporation's TrackPoint® pointing device, a trackpoint-type device similar to those frequently mounted in the keyboards of laptop or notebook data processing systems. A Trackpoint-type device includes a button-like structure (or "post") resembling a pencil eraser protruding from between the keys in a keyboard or from the surface of the structure incorporating the pointing device. The Trackpoint-type device eliminates the need for a flat working surface on which the user must manipulate a mouse.

With the advent of set-top boxes (also referred to as "Web appliances"), wireless or "remote" pointing devices for data processing systems have become popular. Wireless pointing devices transmit infrared signals in much the same manner as television, video cassette recorder, or audio system remote controls. An infrared detector on the set-top box receives the infrared signals and translates them to displacement signals utilized by a conventional mouse.

One disadvantage of current wireless pointing devices is a lack of flexibility in the manner in which the device may be employed. Set-top boxes are often found in residences, where users may employ the wireless remote as a handheld device similar to television remotes. However, in some circumstances, a user may wish to employ the wireless pointing device in a manner similar to a conventional mouse. For example, a child sitting on the floor at a coffee table working on her homework and utilizing the set-top box for research may find it more convenient to utilize the wireless pointing device on the coffee table surface in a manner similar to a conventional mouse.

It would be desirable, therefore, to provide a wireless pointing device which providing flexibility in the manner of use. It would further be advantageous for the wireless pointing device to be reversible, such that it could be employed as a handheld device or on a flat surface similar to a conventional mouse. It would further be advantageous for the pointing device to require minimal surface area when operated in a manner similar to a conventional mouse.

SUMMARY OF THE INVENTION

It is therefore one object of the present invention to provide an improved pointing device for data processing systems.

It is another object of the present invention to provide a reversible, wireless pointing device for data processing systems.

It is yet another object of the present invention to improve the construction and operation of a reversible, wireless pointing device which may be employed either as a handheld device or in conjunction with a flat surface similar to a conventional mouse.

The foregoing objects are achieved as is now described. A reversible, wireless pointing device for a data processing system may be operated as either a handheld remote or in conjunction with a surface in the manner of a conventional mouse. A force sensor projects from one surface of the wireless point device body. Manipulation of the force sensor may be detected by measurement of a capacitive or resistive value dependent upon the position or orientation of the force sensor. Infrared signals representative of the manipulation are emitted by the pointing device and detected by the data processing system from control of a display cursor's movement by the operating system. The force sensor may be manipulated directly by a user's thumb or other digit, or indirectly by contact between the force sensor and an underlying surface and actual or attempted movement of the pointing device relative to the surface. The force sensor may be slightly elastomeric with a rubbery texture to "grip" the underlying surface. Projections from or spacers on the body of the pointing device maintain a sufficient distance from the underlying surface to minimize friction while allow the force sensor to contact the surface with a slight pressure or compressive force. A switch located on the opposite side of the pointing device from the force sensor may be actuated in the manner of a trigger when operated in one orientation or in the manner of a conventional mouse button when operated in the opposite orientation.

The above as well as additional objects, features, and advantages of the present invention will become apparent in the following detailed written description. For one type of force sensor similar to that utilized in trackpoint-type devices, a smaller footprint of surface space is required for operation since actual movement is not required, only pressure or lateral force.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
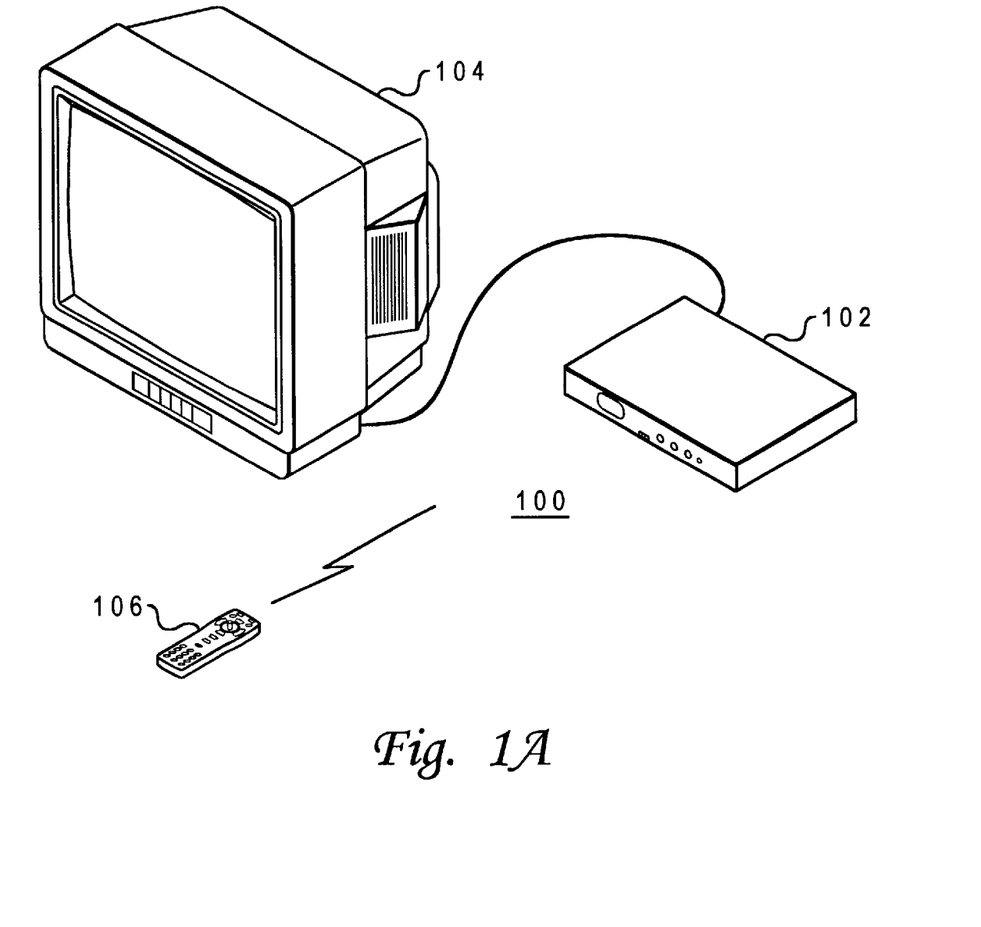
FIGS. 1A–1C depict various pictorial representations of a data processing system in which a preferred embodiment of the present invention may be implemented.
Figure 1B:
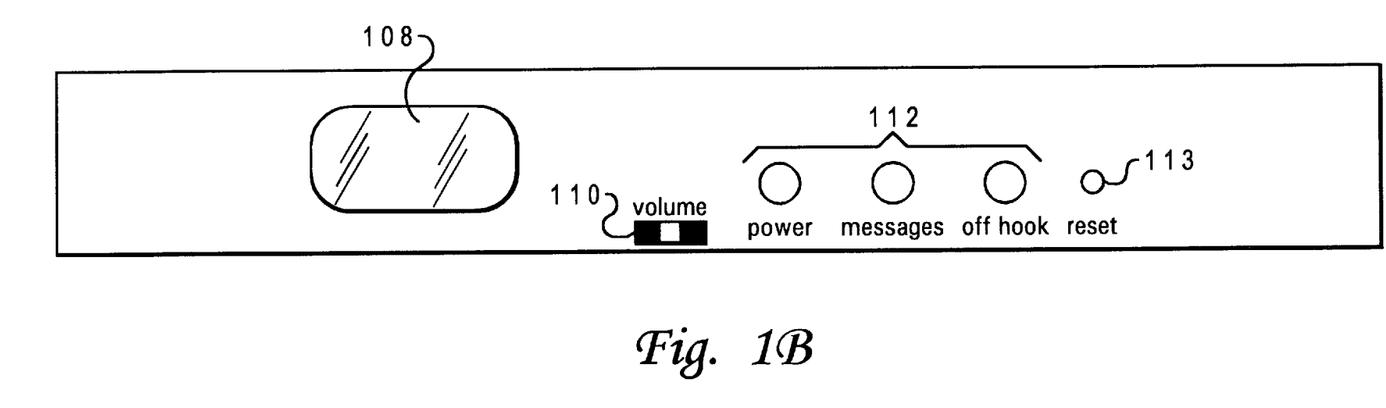
Figure 1C:
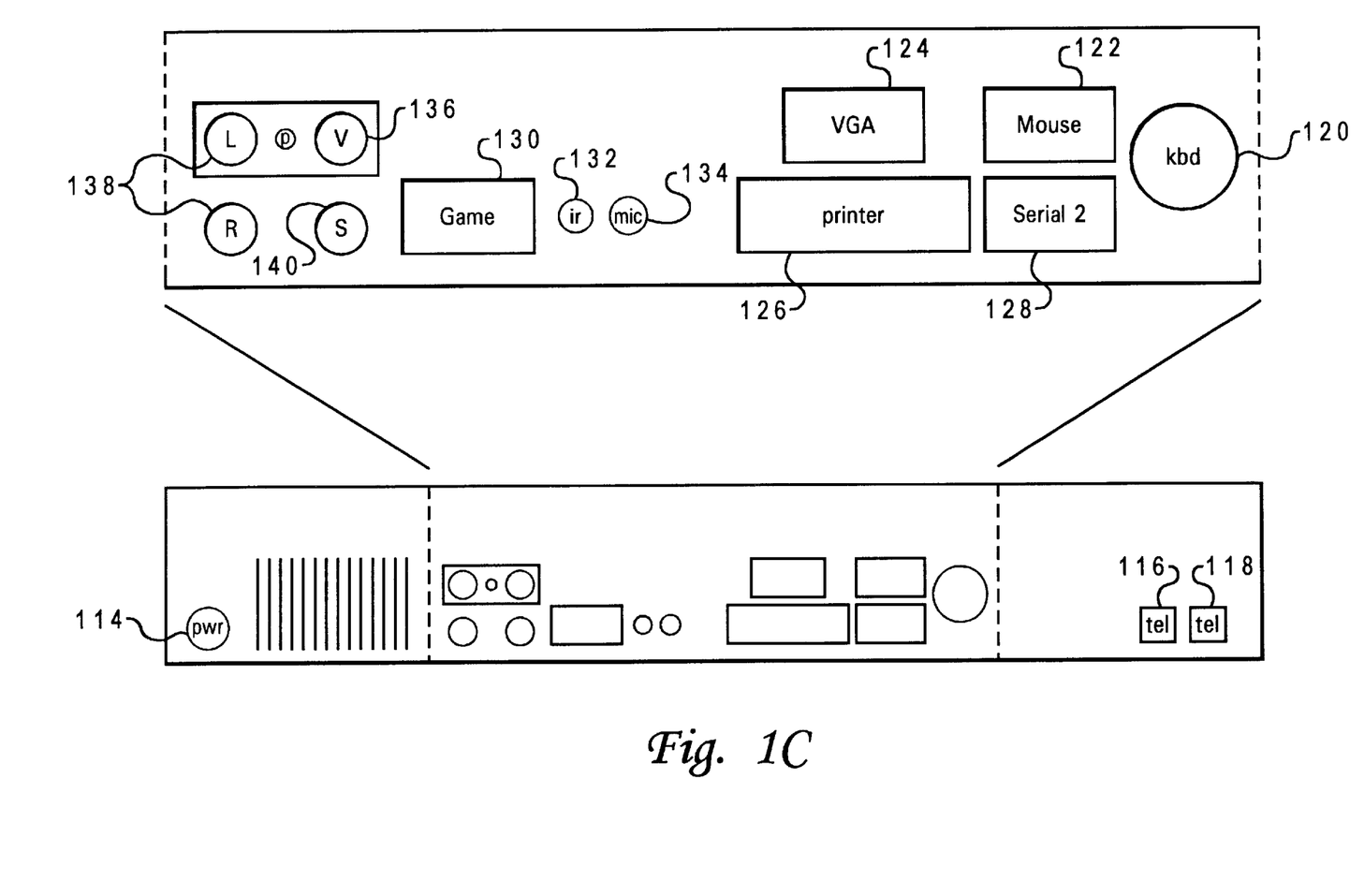

With reference now to the figures, and in particular with reference to FIGS. 1A through 1C, various pictorial representations of a data processing system in which a preferred embodiment of the present invention may be implemented are depicted. FIG. 1A is a pictorial representation of the data processing system as a whole. Data processing system 100 in the depicted example is a set-top type data processing system providing, with minimal economic costs for hardware to the user, access to the Internet. Data processing system 100 includes a data processing unit 102, which is preferably sized to fit in typical entertainment centers and provides all required functionality conventionally found in personal computers to enable a user to "browse" the Internet. Additionally, data processing unit 102 may provide other common functions such as, for example, serving as an answering machine, transmitting or receiving facsimile transmissions, or providing voice mail facilities.

Data processing unit 102 is connected to television 104 for display of graphical information. Television 104 may be any suitable television, although color televisions with an S-Video input will provide better presentations of the graphical information. Data processing unit 102 may be connected to television 104 through a standard coaxial cable connection. A remote control unit 106 allows a user to interact with and control data processing unit 102. Remote control unit 106 emits infrared (IR) signals, preferably modulated at a different frequency than the normal television, stereo, and VCR infrared remote control frequencies in order to avoid interference. Remote control unit 106 provides the functionality of a pointing device in conventional personal computers, including the ability to move a cursor on a display and select items.

FIG. 1B is a pictorial representation of the front panel of data processing unit 102 in accordance with a preferred embodiment of the present invention. The front panel includes an infrared window 108 for receiving signals from remote control unit 106 and for transmitting infrared signals. Data processing unit 102 may transmit infrared signals to be reflected off objects or surfaces, allowing data processing unit 102 to automatically control television 104. Volume control 110 permits adjustment of the sound level emanating from a speaker within data processing unit 102. A plurality of light-emitting diode (LED) indicators 112 provide an indication to the user of when data processing unit 102 is on, whether the user has messages, whether the modem/phone line is in use, or whether data processing unit 102 requires service. System reset switch 113 is utilized only to recover from unusual system failures.

FIG. 1C is a pictorial representation of the rear panel of data processing unit 102 in accordance with a preferred embodiment of the present invention. A three wire (ground included) insulated power cord 114 passes through the rear panel. Standard telephone jacks 116 and 118 on the rear panel provide an input to a modem from the phone line and an output to a handset (not shown). The rear panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a connection for a joystick or other gaming control device (glove, etc.). Infrared extension jack 132 allows a cabled infrared LED to be utilized to transmit infrared signals. Microphone jack 134 allows an external microphone to be connected to data processing unit 102.

Video connection 136, a standard coaxial cable connector, connects to the video-in terminal of television 104 or a video cassette recorder (not shown). Left and right audio jacks 138 connect to the corresponding audio-in connectors on television 104 or to a stereo (not shown). If the user has S-Video input, then S-Video connection 140 may be used to connect to television 104 to provide a better picture than the composite signal. If television 104 has no video inputs, an external channel 3/4 modulator (not shown) may be connected in-line with the antenna connection.

Figure 2:
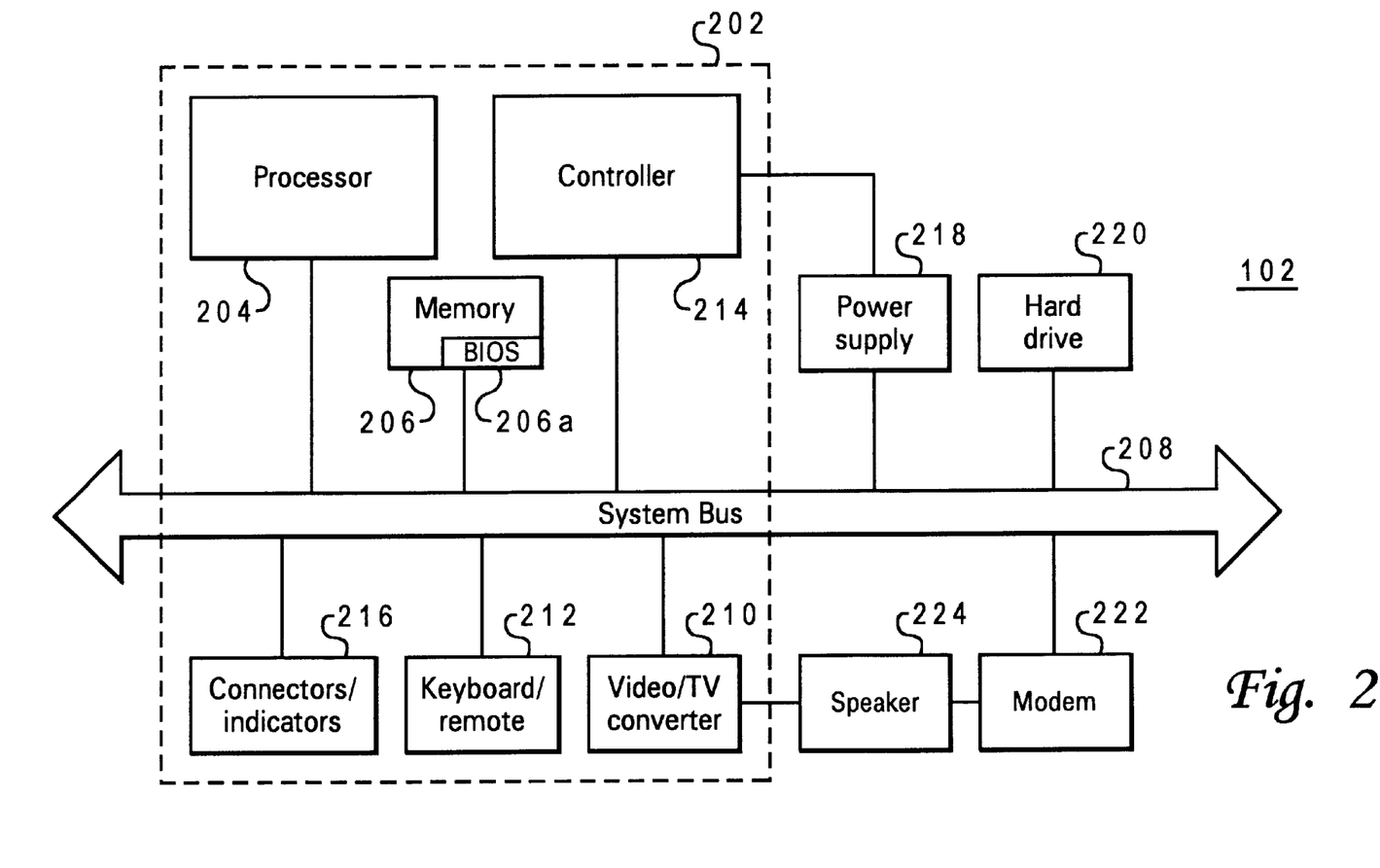
FIG. 2 is a block diagram for the major components of a data processing unit in accordance with a preferred embodiment of the present invention.

Referring now to FIG. 2, a block diagram for the major components of data processing unit 102 in accordance with a preferred embodiment of the present invention is portrayed. As with conventional personal computers, data processing unit 102 includes a motherboard 202 containing a processor 204 and memory 206 connected to system bus 208. Processor 205 is preferably at least a 486 processor operating at or above 100 MHz. Memory 206 includes read only memory (ROM) 206a containing a basic input/output services (BIOS) routine and may include cache memory and/or video RAM.

Video/TV converter 210 on motherboard 202 and connected to system bus 208 generates computer video signals for computer monitors, a composite television signal, and an S-Video signal. The functionality of video/TV converter 210 may be provided utilizing commercially available video and converter chips. Keyboard/remote control interface unit 212 on motherboard 202 receives keyboard codes through controller 214, regardless of whether a wired keyboard and/or pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the functions provided by an infrared keyboard. Connectors and indicators 216 on motherboard 202 provide the connections and indicators on data processing unit 102 described above.

External to motherboard 202 in the depicted example are power supply 218, hard drive 220, modem 222, and speaker 224. Power supply 218 is a conventional power supply except that it receives a control signal from controller 214 which effects shut down of all power to motherboard 202, hard drive 220, and modem 222. In some recovery situations, removing power and rebooting is the only guaranteed method of resetting all of these devices to a known state. Thus, power supply 218, in response to a signal from controller 214, is capable of powering down and restarting data processing unit 102.

Hard drive 220 contains operating system and applications software for data processing unit 102, which preferably includes: IBM DOS 7.0, a product of International Business Machines Corporation in Armonk, N.Y.; Windows 3.1, a product Microsoft Corporation in Redmond, Wash.; and Netscape Navigator, a product of Netscape Communications Corporation in Mountain View, Calif. Data may also be stored on hard drive 220. Modem 222, inserted into a slot mounted sideways on motherboard 202, is preferably a 33.6 kbps modem supporting the V.42bis, V34bis, V.34, V.17 Fax, MNP 1-5, and AT command set.

Controller 214 is preferably one or more of the 805x family controllers. Controller 214 is continuously powered and, when data processing unit 102 is turned on, monitors the system for a periodic "ping" indicating that data processing unit 102 is operating normally. In the event that controller 214 does not receive a ping within a prescribed timeout period, controller 214 removes power from the system and restarts the system. This may be necessary, for example, when the system experiences a general protection fault. If multiple attempts to restart the system prove unsuccessful, controller 214 shuts off data processing unit 102 and signals that service is required through indicators 216. Thus, data processing unit 102 is capable of self-recovery in some circumstances without involvement by a user.

Controller 214 also receives and processes input from infrared remote control 106, infrared keyboard, wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use and specifies the boot sector selection during any power off-on cycle.

Those skilled in the art will recognize that the components depicted in FIGS. 1A–1C and 2 and described above may be varied for specific applications or embodiments. Such variations in which the present invention may be implemented are considered to be within the spirit and scope of the present invention.

Figure 3A:
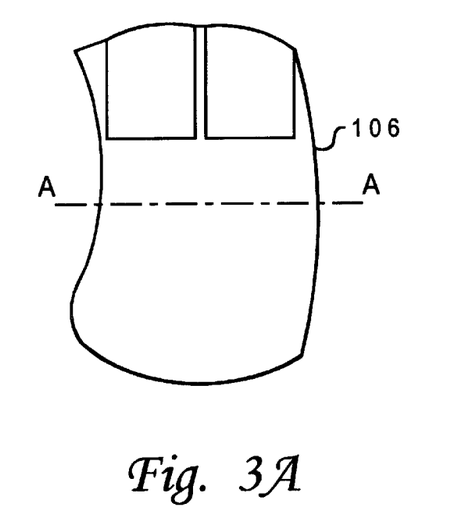
FIGS. 3A–3B depict top and cross-sectional views of a wireless pointing device designed to operate in a manner similar to a conventional mouse.
Figure 3B:
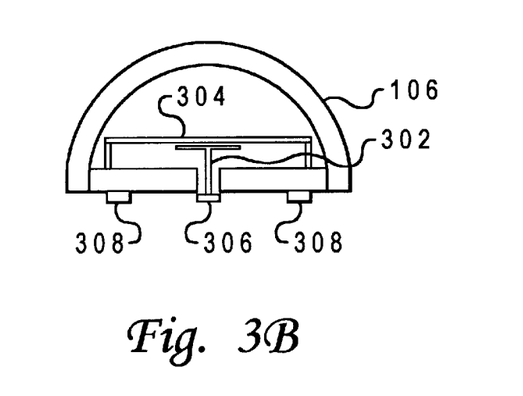

With reference now to FIGS. 3A and 3B, top and cross-sectional views of a wireless pointing device designed to operate in a manner similar to a conventional mouse are depicted. As shown in FIG. 3A, pointing device 106 may have a size (4–5 inches long, about 2.5 inches wide, and about 1.5 inches high) and shape similar to a conventional mouse, with one or more buttons near the front of the mouse as is conventional.

FIG. 3B depicts a cross-sectional view of pointing device 106 taken at section line A—A. Pointing device 106 in the example shown includes a capacitive control mechanism 302 having a disk-shaped base from which a shaft projects. The base of control mechanism 302 forms a capacitance with electrodes on a control circuit mounted on support 304 and may be manipulated to generate control signals for a display cursor, as is known in the art and/or described in the related applications.

A foot 306 at the end of the shaft for control mechanism 302 contacts a surface on which pointing device 106 is utilized, and preferably has an elastomeric, rubber-texture composition allowing foot 302 to "grip" the underlying surface. Spacers 308 maintain a distance between the body of pointing device 106 and the surface on which it rests, preferably having a slick-texture composition to allow a user to easily slide pointing device 106 relative to the underlying surface. Lateral force applied to pointing device 106 relative to a surface which contacts foot 306 will thus result in a change in the orientation of control mechanism 302 with respect to the remainder of pointing device 106. Such changes may be detected and converted to conventional mouse displacement signals in accordance with the known art and/or as described further in the related applications.

An advantage of a wireless mouse of the type depicted in FIGS. 3A and 3B is the small footprint required for operation. Foot 306 remains in place in contact with the underlying surface while the remainder of the pointing device 106 is moved only slightly, perhaps a fraction of a millimeter. Pointing device 106 is thus manipulated by application of lateral force rather than actual movement. The mouse need no be slid or moved across the underlying surface, simply applying pressure is sufficient. This requires less surface area for using pointing device 106 than is required by a conventional mouse. Additional problems such as picking up dust in mechanical parts of the pointing device are eliminated.

Those skilled in the art will recognize that the embodiment described above need not be wireless to achieve benefits. A wired pointing device employing trackpoint-type movement control may be utilized, but with the shaft of the trackpoint-type device fixed relatively immobile by contact with a surface and cursor movement controlled by lateral force applied to the pointing device relative to the surface. This would comprise a very small footprint pointing device, requiring very little surface space or clearance relative to other objects on the surface for operation.

The wired pointing device described has a small footprint since no significant movement—less than one-sixteenth of an inch—of the pointing device relative to the underlying surface is required to measurably alter the orientation of the shaft relative to the underlying surface.

Furthermore, while the wireless pointing device embodiment depicted in FIGS. 3A–3B may be utilized in a manner similar to a conventional mouse, it is not suitable for use as a handheld remote device in a manner similar to television remotes. Thus, in one embodiment of the present invention, the pointing device need not be either wireless or reversible.

Figure 4A:
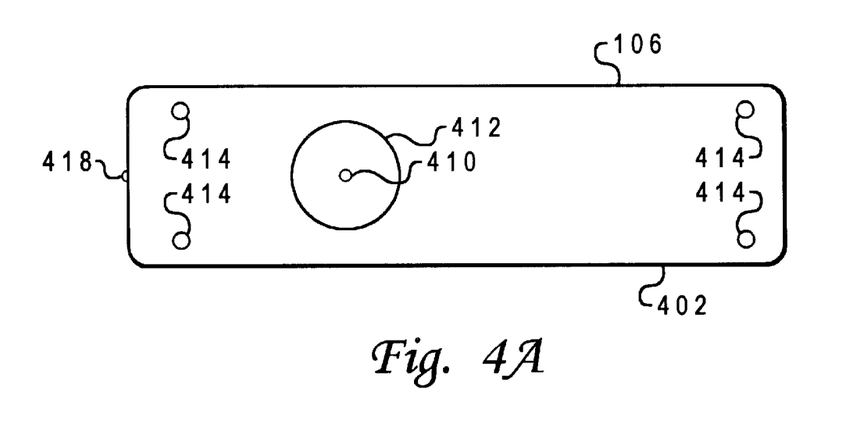
FIGS. 4A–4F are various views of a reversible, wireless pointing device in accordance with a preferred embodiment of the present invention.
Figure 4B:
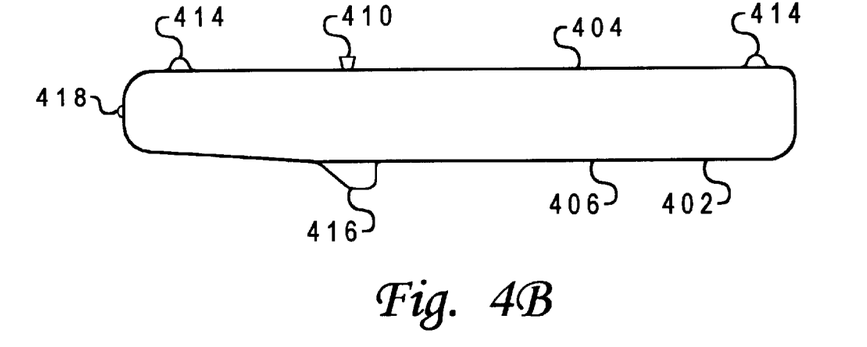
Figure 4C:
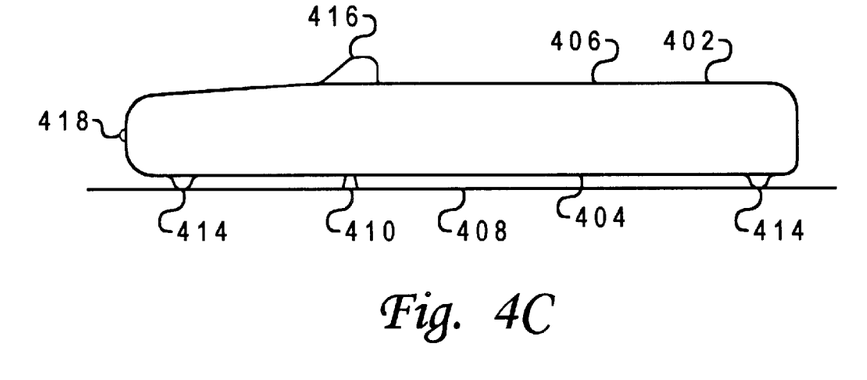

Referring to FIGS. 4A–4F, various views of a reversible, wireless pointing device in accordance with a preferred embodiment of the present invention are illustrated. FIGS. 4A–4C depict top and side views of reversible wireless pointing device 106, which includes a body 402 having opposing surfaces 404 and 406. Body 402 has dimensions not significantly smaller than those of a conventional television remote, but is small enough to be readily employed like a conventional mouse (e.g., about 6 inches long, 2–3 inches wide, and 1 inch thick). The user should be able to hold pointing device 106 between the heel of the palm and the last three fingers of the hand when utilized in the orientation shown in FIG. 4B, or by the sides using the thumb and last three fingers of the hand when utilized in the orientation shown in FIG. 4C.

FIG. 4B shows a side view of reversible wireless pointing device 106 in a first orientation, in which it may be utilized as a handheld remote device, while FIG. 4C shows a side view of pointing device 106 in an opposite orientation, in which it may be employed in conjunction with a flat surface 408 similar to a conventional mouse.

Pointing device 106 includes a force sensor 410, which forms a part of the physical control mechanism measured by a control circuit to generate cursor control signals. User application of force to force sensor 410—either directly utilizing the user's thumb or other digit or indirectly by contact of force sensor 410 with surface 408 and sliding or other movement of body 402 relative to surface 408—results in movement of a cursor within the display of a data processing system. The application of pressure to force sensor 410 is translated into infrared signals emitted by pointing device 106, which are detected in the data processing system and translated to conventional mouse displacement signals used by the operating system to control cursor display and movement.

Force sensor 410 projects from recess 412 on surface 404 of body 402, projecting from surface 404 by an amount sufficient to permit manipulation by a user's digit (e.g., thumb or index finger). Force sensor 410 also projects from surface 404 by an amount sufficient, but not substantially greater than necessary, to permit the end of force sensor 410 to contact surface 408 on which pointing device 106 may be resting when utilized in the orientation shown in FIG. 4C.

Similar to foot 306 depicted in FIG. 3B, force sensor 410 preferably is formed of a slightly elastomeric material having a rubber-like texture for gripping surface 408, such as silicone. Alternatively, force sensor 410 may be fitted with a cap made of such material, as is frequently done with trackpoint-type devices.

Body 402 is preferably formed of molded plastic and includes projections 414. Projections 414 protrude from surface 404 of body 402 to an amount equal to the distance force sensor 410 projects from surface 404. Thus, projections 414 hold body 402 away from surface 408 while pointing device 106 is being utilized in the orientation shown in FIG. 4C, but not at a distance preventing force sensor 410 from contacting surface 408.

Projections 414 preferably have a uniform height and hold body 402 away from surface 408 at a distance which allows force sensor 410 to contact surface 408 with a slight pressure or compressive force, facilitating the "gripping" of surface 408 by force sensor 410. The distances by which force sensor 410 and projections 414 extend from surface 404 of pointing device 106 should exceed the height of any buttons on surface 404 by a margin sufficient to ensure clearance between such buttons and surface 408, even if surface 408 is a slightly compressible surface such as a carpet or a fabric-covered sofa arm.

Projections 414 are preferably integrally formed with body 402 (e.g., as part of a molded plastic case for pointing device 106), and preferably have a rounded or hemispherical profile. Alternatively, however, projections 414 may be affixed to body 402 with adhesive and may have a square profile similar to spacers 308 depicted in FIG. 3B.

Body 402 should include preferably two, but as many as four or more, projections 414, which are preferably spaced around the periphery of surface 404 to provide uniform and stable support for pointing device 106 when resting on surface 408. In the example shown, where body 402 has a generally rectangular shape, projections 414 are located near the corners of surface 404.

Pointing device 106 also includes at least one button or switch 416. In the preferred embodiment, switch 416 protrudes from surface 406 of body 402, opposite force sensor 410. The user actuates switch 416 with the index finger in the manner of a trigger when holding pointing device 402 for operation in the orientation shown in FIG. 4B, and actuates switch 416 by depressing it with the index finger in the manner of a conventional mouse button when pointing device 106 is operated in the orientation shown in FIG. 4C. However, switch 416 or any similar actuating button or buttons may be situated at any location on pointing device 402 which is convenient for operation.

Pointing device 106 also includes light emitting diode (LED) 418 for transmitting infrared signals responsive to manipulation of force sensor 410 in the manner of conventional remote controls and remote pointing devices such as those described in the related applications. A control circuit (not shown) generating such infrared signals and the control mechanism (not shown) of the control circuit, which is coupled to force sensor 410, are contained within body 402.

Figure 4D:
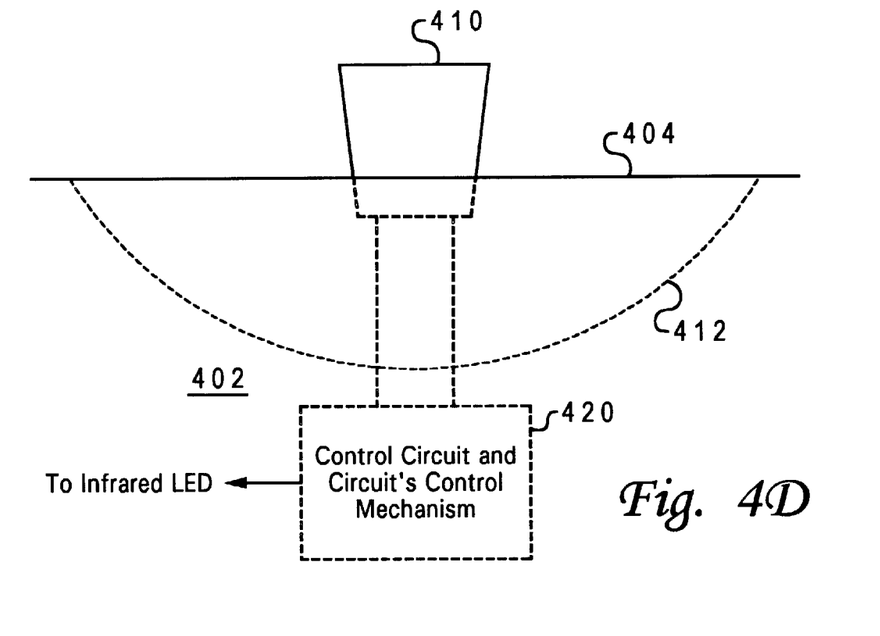

FIG. 4D depicts a side view of force sensor 410 in greater detail, with items inside body 402 shown in phantom. In the embodiment shown, force sensor 410 is a cap on the shaft of a trackpoint-type device of the type known in the art and/or described in the related applications. The shaft on which cap/force sensor 410 is fitted is physically coupled to the control mechanism within control circuit 420, which detects force on force sensor 410 relative to body 402 and generates signals representative of such force to be emitted by pointing device 106 via infrared LED 418.

Figure 4E:
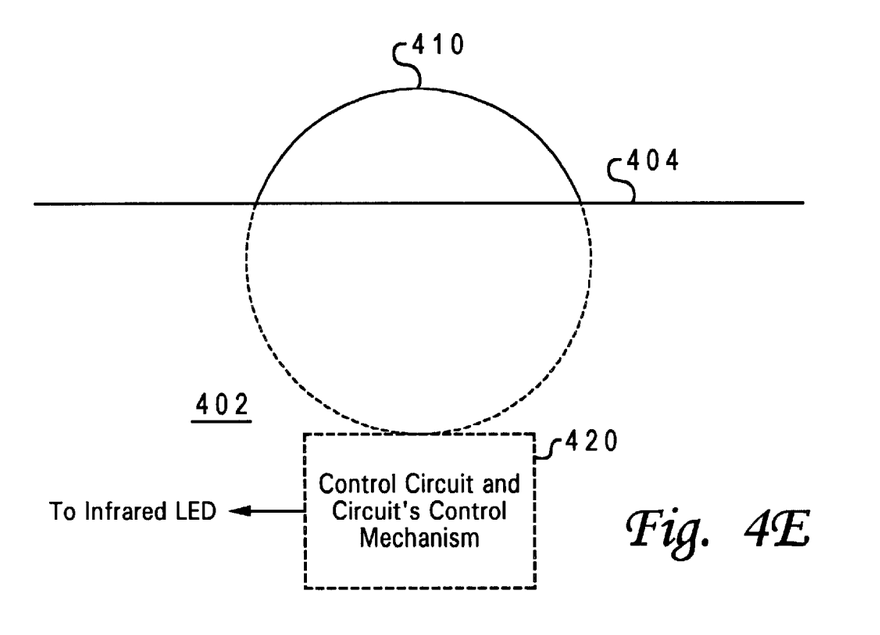

FIG. 4E depicts a side view of force sensor 410 in greater detail for an alternative embodiment, with items inside body 402 again shown in phantom. In this embodiment, force sensor 410 is a roller ball of the type known and used in a conventional mouse or trackball pointing device. Recess 412 within body 402 is not required, and force sensor 410 is physically coupled to control circuit 420 by rollers as is known in the art.

Figure 4F:
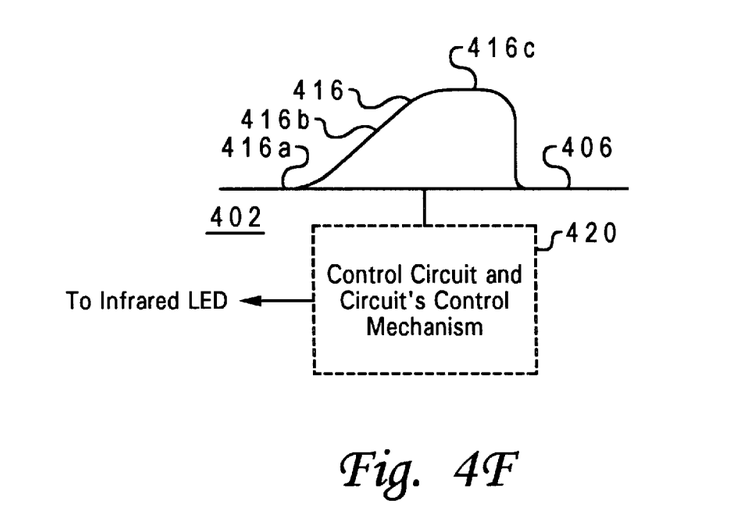

FIG. 4F depicts a side-view of switch 416 in greater detail, with components inside body 402 shown in phantom. To facilitate actuation in the manner of a trigger when operated in one orientation and in the manner of a conventional mouse button when operated in the opposite orientation, switch 416 preferably pivots around a point 416a near the front of switch 416a (spring biased towards the switch-open position), and has a profile including a sloped surface 416b at the front and a flat or rounded surface 416c at the top. Switch 416 is electrically connected to control circuit 420.

The present invention provides a wireless pointing device which may be reversibly operated either as a handheld remote or as a conventional mouse, but requiring less desk space. The force sensor and button or switch are adapted for operation in either orientation. An internal mercury switch or microswitch (not shown) protruding through surface 404 detects which orientation is being used, which causes the vertical mouse movement information passed to the computer to be reversed (or inverted). The horizontal movement information does not need reversed and is correct in either orientation. The pointing device thus increases the flexibility of use in conjunction with a data processing system such as a set-top box.

While the invention has been particularly shown and described with reference to a preferred embodiment, it will be understood by those skilled in the art that various changes in form and detail may be made therein without departing from the spirit and scope of the invention.

What is claimed is:

1. A reversible, wireless pointing device, comprising:
   a body having a first surface;
   a trackpoint-type force sensor in the body, an elastomeric cap portion of the force sensor projecting from the first surface by an amount sufficient to enable manipulation of the force sensor:
      by a user's appendage when the pointing device is utilized in a first mode, and
      by contact of the force sensor with an operating surface on which the pointing device rests and efforts by the user to move the body relative to the surface when the pointing device is utilized in a second mode; and a control circuit within the body emitting cursor control signals responsive to manipulation of the force sensor.

2. The reversible, wireless pointing device of claim 1, further comprising:

a plurality of spacer projections on the first surface of the body the spacer projections holding the first surface of the body away from the operating surface on which the pointing device rests when the pointing device is utilized in the second mode.

3. The reversible, wireless pointing device of claim 2, wherein the projecting portion of the force sensor projects from the first surface by an amount substantially equal to a height of the spacer projections from the first surface and wherein the pointing device has a first orientation when utilized in the first mode and a second orientation opposite the first orientation when utilized in the second mode.

4. The reversible, wireless pointing device of claim 3, wherein the spacer projections comprise hemispherical projections spaced around a periphery of the first surface.

5. The reversible, wireless pointing device of claim 3, further comprising:

an actuating button on a surface of the body opposite the first surface.

6. The reversible, wireless pointing device of claim 5, wherein the actuating button is positioned for operation by a user's index finger when the force sensor is operated by a user's thumb in the first mode.

7. The reversible, wireless pointing device of claim 5, wherein the actuating button is positioned for operation by a user's index finger when the force sensor is operated in the second mode by contact with an underlying surface forming the operating surface and attempted movement of the body relative to the underlying surface.

8. A data processing system, comprising:

a display for displaying a user interface including a cursor;

a data processing unit connected to the display and including a wireless control input; and a wireless pointing device including:

a body having a first surface;

a trackpoint-type force sensor in the body, a cap portion of the force sensor projecting from the first surface by an amount sufficient to enable manipulation of the force sensor:

by a user's appendage when the pointing device is utilized in a first mode, and by contact of the force sensor with an operating surface on which the pointing device rests and efforts by the user to move the body relative to the operating surface when the pointing device is utilized in a second mode; and a control circuit within the body emitting cursor control signals responsive to manipulation of the force sensor, wherein the cursor control signals are received by the wireless control input and translated into cursor movement in the user interface.

9. The data processing system of claim 8, wherein the wireless pointing device further comprises:

a plurality of spacer projections spaced around a periphery of the first surface, the spacer projections holding the first surface of the body away from the operating surface by an amount substantially equal to the amount by which the force sensor projects from the first surfaces, wherein the pointing device has a first orientation and is operated as a handheld remote in the first mode and rests on the operating surface with a second orientation opposite the first orientation and is operated as a wireless mouse in the second mode.

10. The data processing system of claim 10, wherein the pointing device further comprises:

an actuating button on a surface of the body opposite the first surface, the actuating button positioned along a long axis of the body relative to the force sensor for operation:

as a trigger by a user's index finger when the pointing device is employed as a handheld remote in the first mode, and as a conventional mouse button by a user's index finger when the pointing device is employed as a wireless mouse in the second mode.

11. A reversible, wireless pointing device, comprising:

a body having a first surface;

a trackpoint-type force sensor in the body, a cap portion of the force sensor projecting from the first surface;

a plurality of projections on the first surface, the projections having a height above the first surface substantially equal to a distance by which the force sensor projects from the first surface; and a control circuit within the body emitting cursor control signals responsive to manipulation of the force sensor.

12. The reversible, wireless pointing device of claim 11, wherein the force sensor may be manipulated:

by a user's appendage when the pointing device is employed as a handheld remote, and by contact of the force sensor with an operating surface and attempted movement of the body relative to the operating surface when the pointing device is employed as a wireless mouse.

13. The reversible, wireless pointing device of claim 11, further comprising:

an actuating button on a surface of the pointing device opposite the first surface.

14. The reversible, wireless pointing device of claim 11, wherein the actuating button is positioned relative to the force sensor for operation:

as a trigger by a user's index finger when the pointing device is employed as a handheld remote with the force sensor manipulated by the user's thumb, and as a conventional mouse button by a user's index finger when the pointing device is employed as a wireless mouse with the force sensor manipulated by contact of the force sensor with an operating surface and attempted movement of the body relative to the operating surface.

\* \* \* \* \*